United States Patent Office.

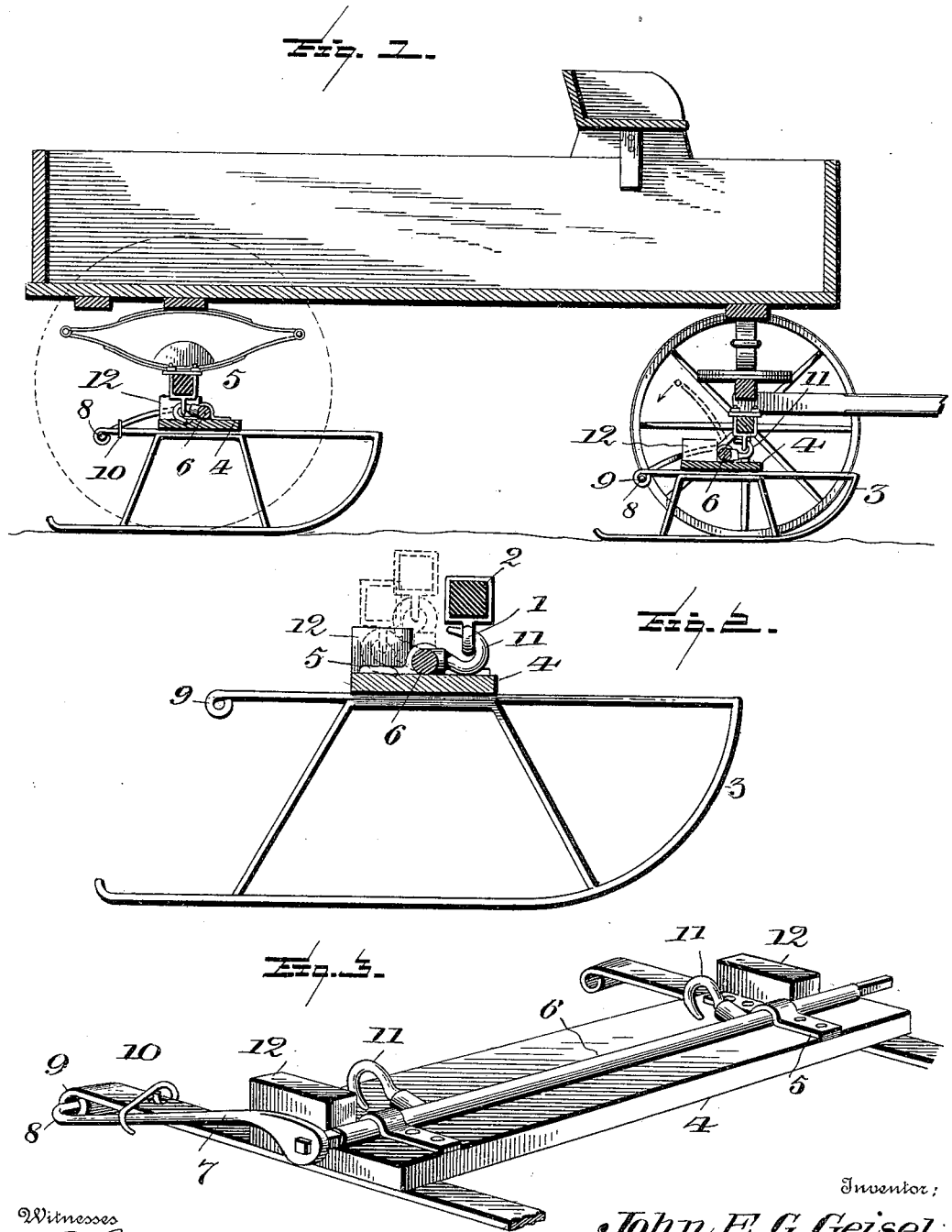

JOHN EARNEST GEORGE GEISEL, OF WEISSPORT, PENNSYLVANIA.

SLEIGH-RUNNER ATTACHMENT FOR VEHICLES.

SPECIFICATION forming part of Letters Patent No. 621,242, dated March 14, 1899.

Application filed November 9, 1898. Serial No. 695,993. (No model.)

*To all whom it may concern:*

Be it known that I, JOHN EARNEST GEORGE GEISEL, a citizen of the United States, residing at Weissport, in the county of Carbon and State of Pennsylvania, have invented certain new and useful Improvements in Sleigh-Runner Attachments for Vehicles; and I do hereby declare the following to be a full, clear, and exact description of the invention, such as will enable others skilled in the art to which it appertains to make and use the same.

This invention relates to sleigh-runner attachments for vehicles; and the object of the invention is to provide an attachment of the character referred to which will greatly facilitate the converting of a wheeled vehicle into a sleigh.

In constructions heretofore devised it has always taken considerable time and labor in order to apply runners to a vehicle and remove the runners therefrom, necessitating the application to the axle each time the change was made of various clips, levers, and operating devices, by means of which after the runners were applied they could be raised or lowered as needed. In the present construction the runners may be pushed under the vehicle-axle and instantly coupled thereto, whereupon the devices carried by the runner attachments may be utilized as jacks for elevating the axles of the vehicle, thereby enabling the wheels to be readily removed without trouble or waste of time.

With the above object in view the invention consists in certain novel features and details of construction and arrangement of parts, as hereinafter fully described, illustrated in the drawings, and incorporated in the claims.

In the accompanying drawings, Figure 1 is a longitudinal section through the body of the vehicle, showing the manner of applying the runner attachments thereto. Fig. 2 is an enlarged detail sectional view of one of the runner attachments, showing the several positions of the parts as the attachment is being applied to a vehicle. Fig. 3 is a detail perspective view of a part of the attachment, showing the position of the parts thereof after the attachment has been applied.

Similar numerals of reference designate corresponding parts in all the figures of the drawings.

In carrying out the present invention it is only necessary to apply to both axles of the vehicle eyes 1, the said eyes being connected to the axle in any convenient or desired manner, preferably by means of bands or clips 2, surrounding and clamped upon the axle.

The runner attachment embodies, essentially, a pair of runners 3, located a considerable distance apart and connected by a cross-bar or top 4. The cross-bar 4 is provided at spaced points with bearings 5, in which is journaled a rock-shaft 6, provided with squared ends and having detachably applied to one end thereof a crank or operating arm 7. The end of the crank-arm 7 is bent, as indicated at 8, to extend inwardly, so that it may be inserted in a socket 9 in the adjacent runner for preventing accidental rocking of said arm and the dislocation of the attachment. The crank-arm 7 is held against displacement by means of a hook 10, pivotally mounted on the runner.

At points intermediate of the bearings 5 the rock-shaft 6 has right-angularly-projecting hooks 11, the extremities of which extend rearward and form means for engaging one of the axles. The extremities of the hooks also project above the upper surface of the shaft 6 when said arms lie in a horizontal position, as shown in full lines in Fig. 2.

In order to apply the attachment to a vehicle while the vehicle is standing upon its wheels, the attachment is pushed under the axle, the attachment being made so that it will just clear and pass easily beneath the axle, while the parts occupy the positions shown in full lines in Fig. 2. In inserting the attachment beneath the vehicle the hooks 11 are allowed to pass to one side of the eyes 1 on the axle, after which the attachment is moved laterally sufficiently to bring the points of the hooks into line with the eyes 1. The attachment is then drawn backward until the hooks enter the eyes. The crank-arm 7 is now applied to the shaft 6 and operated to turn the shaft, thus adapting the mechanism on the attachment to act as a jack for elevating the axle, the end of the crank-arm being finally inserted in the socket 9, thus locking the parts of the jack in place. Two of said attachments are employed, one for each axle, and after they have been applied the wheels of the vehicle are detached, the axles lowered onto blocks or rests 12 or upon the bar 4 itself, and the vehicle is now converted from a wheeled vehicle into a sleigh. In converting it from a sleigh to a wheeled vehicle the operation just above described is simply reversed. The hook 10 holds the crank-arm 7 securely against accidental displacement, and the crank-arm locks the axle down on the blocks 12 or the cross-bar 4.

By means of the construction above described the vehicle may be quickly changed from a wheeled vehicle to a sleigh, and vice versa, and there are no parts to attach to or to detach from the vehicle proper, and when the attachments are removed there are no unsightly clips, levers, &c., remaining on the vehicle, but merely a pair of eyes on each axle, which, being under the axle, are to a great extent concealed from view.

Having thus described the invention, what is claimed as new, and desired to be secured by Letters Patent, is—

1. In a bob-sleigh, means carried by the sleigh and detachable therewith for raising a vehicle-axle and attaching the sleigh to the vehicle.

2. A bob-sleigh comprising a rock-shaft, operating means therefor, and axle-engaging means on said shaft, whereby the axle is lifted when the shaft is turned, all of said parts being mounted on the sleigh and detachable therewith.

3. A bob-sleigh comprising a rock-shaft journaled thereon, axle engaging and lifting means on said shaft, and means for operating said shaft.

4. A bob-sleigh comprising a runner, a rock-shaft thereon, axle-engaging means connected to said rock-shaft, and means for operating and locking said rock-shaft, all of said parts being mounted on the sleigh and detachable therewith.

5. In a bob-sleigh, a rock-shaft, operating means therefor, and hooks on said shaft for engagement with devices on a vehicle-axle, all of said parts being mounted on the sleigh and detachable therewith.

6. In a bob-sleigh, a rock-shaft, axle-engaging means thereon, and a crank-arm detachably mounted on said shaft.

7. In a bob-sleigh, a rock-shaft, axle-engaging means thereon, and a crank-arm on said shaft having provision for its engagement with the sleigh-frame, whereby the crank-arm may be held from moving.

8. In a bob-sleigh, a rock-shaft, axle-engaging means thereon, and a crank-arm for said shaft having a projection to engage a socket in the sleigh-frame.

9. In a bob-sleigh, a rock-shaft, axle-engaging means thereon, and a crank-arm for said shaft having its ends bent to engage the sleigh-frame.

10. In a bob-sleigh, a rock-shaft, axle engaging and lifting means thereon, operating means for said shaft, and a rest on the sleigh-frame upon which a vehicle-axle may bear after it has been lowered.

11. A sleigh-runner attachment for vehicles, embodying a pair of runners, a rock-shaft journaled thereon, and provided with means for engaging one of the axles, and a crank-arm for operating said rock-shaft, all of said parts being mounted on the sleigh and detachable therewith.

12. A vehicle-axle provided with a pair of eyes, in combination with a sleigh-runner attachment comprising a pair of runners, a rock-shaft journaled thereon, a crank-arm for operating said rock-shaft, means on the attachment for fastening said crank-arm, and hooks on said shaft for engagement with the eyes on the axle, all of said parts with the exception of the eyes being mounted on the sleigh and detachable therewith.

13. A sleigh-runner attachment for vehicles, comprising a pair of runners, and a jack mounted thereon for elevating one of the vehicle-axles, said jack comprising a rock-shaft, a crank-arm for operating said rock-shaft, provision for locking or fastening the crank-arm, and means on said rock-shaft to engage the vehicle-axle, all of said parts being mounted on the sleigh and detachable therewith.

In testimony whereof I affix my signature in presence of two witnesses.

JOHN EARNEST GEORGE GEISEL.

Witnesses:
  CHAS. F. KELLEY,
  DAVID SHEFF.